US009338022B2

(12) United States Patent
Jung et al.

(10) Patent No.: US 9,338,022 B2
(45) Date of Patent: May 10, 2016

(54) METHOD OF PROCESSING ACTION, METHOD OF CONTROLLING CONTROLLED DEVICE, CONTROLLED DEVICE, AND CONTROL POINT

(75) Inventors: Dong-shin Jung, Suwon-si (KR); Joo-yeol Lee, Seoul (KR); Seung-jae Oh, Seoul (KR); Se-hee Han, Seoul (KR); Won-seok Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1005 days.

(21) Appl. No.: 11/958,609

(22) Filed: Dec. 18, 2007

(65) Prior Publication Data
US 2008/0221716 A1 Sep. 11, 2008

(30) Foreign Application Priority Data
Mar. 8, 2007 (KR) .......................... 10-2007-0023191

(51) Int. Cl.
G06F 17/00 (2006.01)
H04L 12/28 (2006.01)
G06F 9/54 (2006.01)

(52) U.S. Cl.
CPC ............ *H04L 12/2823* (2013.01); *G06F 9/542* (2013.01); *G06F 2209/544* (2013.01); *H04L 12/2805* (2013.01); *H04L 12/2816* (2013.01); *H04L 2012/2849* (2013.01)

(58) Field of Classification Search
USPC ........................................................ 709/227
See application file for complete search history.

(56) References Cited

U.S. PATENT DOCUMENTS

| 5,739,760 A * | 4/1998 | Hatakeyama ...... G05B 23/0208 |
| | | 340/2.81 |
| 6,266,698 B1 * | 7/2001 | Klein et al. .................... 709/227 |
| 7,177,325 B2 * | 2/2007 | Claseman ............. H04L 1/1607 |
| | | 370/469 |
| 2002/0018551 A1 * | 2/2002 | Sainio ................. H04M 3/4228 |
| | | 379/219 |
| 2002/0054170 A1 * | 5/2002 | Rush et al. ..................... 345/854 |
| 2002/0059295 A1 | 5/2002 | Ludtke et al. |
| 2002/0112058 A1 | 8/2002 | Weisman et al. |
| 2004/0078486 A1 | 4/2004 | Salahshoor et al. |
| 2004/0240451 A1 | 12/2004 | Lee et al. |
| 2005/0120246 A1 * | 6/2005 | Jang et al. ..................... 713/201 |
| 2006/0150236 A1 * | 7/2006 | Sakuda et al. ................ 725/135 |
| 2006/0179137 A1 * | 8/2006 | Jennings et al. ............. 709/224 |

(Continued)

FOREIGN PATENT DOCUMENTS

CN 1210409 A 3/1999
EP 0993165 A2 4/2000

(Continued)

OTHER PUBLICATIONS

Backman, WO 2006/053581 A1, May 26, 2006, pp. 1-23.*

(Continued)

*Primary Examiner* — Andrew Goldberg
(74) *Attorney, Agent, or Firm* — Sughrue Mion, PLLC (57) ABSTRACT

A method of processing an action executes an action requested by a control point for controlling a controlled device through a network, stores a result of executing the action as a pending result of the action when a network connection between the controlled device and the control point is terminated, and transmits the stored pending result of the action to the control point when the network connection between the controlled device and the control point is resumed.

18 Claims, 7 Drawing Sheets

(56) References Cited

U.S. PATENT DOCUMENTS

2006/0217104 A1* 9/2006 Cho ............................ 455/352
2006/0274753 A1* 12/2006 Park et al. .................... 370/392
2007/0143488 A1 6/2007 Pantalone
2007/0157295 A1* 7/2007 Mangalore .............. G06F 21/10
726/6

FOREIGN PATENT DOCUMENTS

| GB | 2330503 A | 8/1998 |
| KR | 1020050055134 A | 6/2005 |
| KR | 1020060033558 A | 4/2006 |
| KR | 100596757 B1 | 7/2006 |
| KR | 1020060125440 A | 12/2006 |
| WO | 2006/135758 A1 | 6/2006 |

OTHER PUBLICATIONS

Communication from the State Intellectual Property Office of P.R. China issued Jun. 12, 2010, in counterpart Chinese Application No. 200810003572.X.
Notice of Allowance dated Jan. 31, 2009 from the Korean Intellectual Property Office in counterpart Korean application No. 1020070023191.
Communication, dated Feb. 27, 2012, issued by the Indian Patent Office in corresponding Indian Application No. 75/MUM/2008.
Communication dated Jun. 30, 2012 issued by the Government of India in counterpart Indian Application No. 75/MUM/2008.
Communication dated May 31, 2012 issued by the European Patent Office in counterpart European Application No. 08100698.3.
Communication from the European Patent Office issued Sep. 9, 2013 in counterpart European Application No. 08100698.3.

* cited by examiner

```
POST /dtv/control/tvcontrol HTTP/1.1
    HOST: 192.168.100.11:5200
    CONTENT-LENGTH: 286
    CONTENT-TYPE: text/xml; charset="utf-8"
    SOAPACTION: "urn:schemas-upnp-org:service:tvcontrol:1#channelSearch"
    PENDING-RESULT: 2fac1234-31f8-11b4-a222-08002b34c003

<?xml version="1.0"?>
    <s:Envelope
      xmlns:s="http://schemas.xmlsoap.org/soap/envelope/"
      s:encodingStyle="http://schemas.xmlsoap.org/soap/encoding/">
        <s:Body>
            <u:channelSearch xmlns:u="urn:schemas-upnp-org:service:tvcontrol:1">
                <argumentName>1</argumentName>
            </u:actionName>
        </s:Body>
    </s:Envelope>
```

FIG. 8

```
HTTP/1.1 200 OK
EXT:
CONTENT-TYPE: text/xml; charset="utf-8"
DATE: Tue, 24 Oct 2006 16:14:10 GMT
SERVER: Linux/6.2 UPnP/1.1 SEC_DTV/1.0
CONTENT-LENGTH: 245

<?xml version="1.0"?>
<s:Envelope
  xmlns:s="http://schemas.xmlsoap.org/soap/envelope/"
  s:encodingStyle="http://schemas.xmlsoap.org/soap/encoding/">
    <s:Body>
        <u:channelSearchResponse xmlns:u="urn:schemas-upnp-org:service:tvcontrol:1">
            <argumentName>50</argumentName>
        </u:channelSearchResponse>
    </s:Body>
</s:Envelope>
```

FIG. 9

```
M-SEARCH * HTTP/1.1
HOST: 239.255.255.250:1900
MAN: "ssdp:discover"
MX: 3
ST: urn:schemas-upnp-org:service:tvcontrol:1
CPID: "2fac1234-31f8-11b4-a222-08002b34c003"
```

FIG. 10

```
HTTP/1.1 200 OK
CACHE-CONTROL: max-age = 30
DATE: Tue, 24 Oct 2006 17:05:15 GMT
EXT:
LOCATION: 192.168.100.200/scpd/sec_dtv/dtv_scpd.xml
SERVER: Linux/6.2 UPnP/1.1 SEC_DTV/1.0
ST: urn:schemas-upnp-org:service:tvcontrol:1
USN: upnp:uuid:k91d4fae-7dec-11d0-a765-00a0c91c6bf6
BOOTID.UPNP.ORG: 1283
CONFIGID.UPNP.ORG: 1024

<PendingResult>
    <resultHeader>HTTP/1.1 200 OK</resultHeader>
    <resultHeader>EXT:</resultHeader>
    <resultHeader>CONTENT-TYPE: text/xml; charset="utf-8"</resultHeader>
    <resultHeader>DATE: Tue, 24 Oct 2006 16:14:10 GMT</resultHeader>
    <resultHeader>SERVER: Linux/6.2 UPnP/1.1 SEC_DTV/1.0</resultHeader>
    <resultHeader>CONTENT-LENGTH: 245</resultHeader>
    <s:Envelope
        xmlns:s="http://schemas.xmlsoap.org/soap/envelope/"
        s:encodingStyle="http://schemas.xmlsoap.org/soap/encoding/">
        <s:Body>
            <u:channelSearchResponse xmlns:u="urn:schemas-upnp-org:service:tvcontrol:1">
                <argumentName>50</argumentName>
            </u:channelSearchResponse>
        </s:Body>
    </s:Envelope>
</PendingResult>
```

METHOD OF PROCESSING ACTION, METHOD OF CONTROLLING CONTROLLED DEVICE, CONTROLLED DEVICE, AND CONTROL POINT

CROSS-REFERENCE TO RELATED PATENT APPLICATION

This application claims priority from Korean Patent Application No. 10-2007-0023191, filed on Mar. 8, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to a home network, and more particularly, to a method of processing an action based on universal plug and play (UPnP) technology, a method of controlling a device, a controlled device controlled using the method, and a control point.

2. Description of the Related Art

In general, a home network is constructed using an Internet protocol (IP). In the home network, various devices used at home such as different types of personal computers (PCs), intelligent products, wireless devices, and the like are connected in a common virtual computing environment called a middleware in order to be controlled.

The middleware allows various digital devices to connect to each other in a peer-to-peer manner and communicate with each other. Examples of the middleware include home audio/video interoperability (HAVi), universal plug and play (UPnP), java intelligent network infra-structures (Jini), and home wide web (HWW).

After a plug and play (PnP) function is added to a current operating system (OS), installing and setting PC peripheral devices becomes easier. UPnP is a technology for expanding a function to the entire network on the basis of Internet standard technologies such as transmission control protocol/internet protocol (TCP/IP), hypertext transfer protocol (HTTP), and extensible markup language (XML) so as to enable network devices such as various domestic appliances, network printers, and Internet gateways to perform networking, and more particularly, home networking.

A UPnP network includes a controlled device which is connected to an IP-based home network and a control point for controlling the controlled device. The UPnP network allows the control point and the controlled device to communicate with each other through operations as presented below by using a UPnP protocol stack structure including Internet protocols such as the TCP/IP and the HTTP and technologies such as the XML and simple object access protocol (SOAP).

The first step is an addressing operation wherein the control point and the controlled device have their IP addresses allocated. When the controlled device participates in the network, the controlled device receives its IP address by using a dynamic host configuration protocol (DHCP), or if no DHCP server is available in the network, the controlled device uses its IP address by using an auto IP function.

The second step is a discovery operation wherein the control point searches for the controlled device or the controlled device advertises its location. The discovery operation is performed by using a simple service discovery protocol (SSDP). When the controlled device is added to the network, the controlled device transmits an SSDP alive message to the network by using an IP multicast function. The control point receives the alive message and then knows the existence of the controlled device. On the other hand, when the control point newly joins the network, the control point transmits an SSDP multicast-search (M-search) message to the network, and the controlled devices which check the M-search message transmit M-search response messages including their information to the control point.

The third step is a description operation wherein the control point checks the description of the controlled devices. The control point checks the response message, and as needed, the control point can request detailed information from the controlled devices. The controlled device which receives the request transmits its detail information as an XML document.

The fourth step is a control operation wherein the control point controls functions of the controlled devices to operate the controlled devices. When the control point wants to control a predetermined controlled device, the control point transmits a desired service to the predetermined controlled device on the basis of the detailed information on the predetermined controlled device by using SOAP. SOAP is a protocol written based on the XML of the HTTP for remote function calls.

The fifth step is an event operation wherein the control point receives an event change in the controlled device. When the control point wants to receive an event message from the controlled device, the control point transmits a subscribing request for a corresponding event to the controlled device. When the subscription succeeds, the controlled device transmits the event message to the control point using a general event notification architecture (GENA).

The sixth step is a presentation operation wherein the control point presents a status of the controlled device using the HTML.

Figure 1:
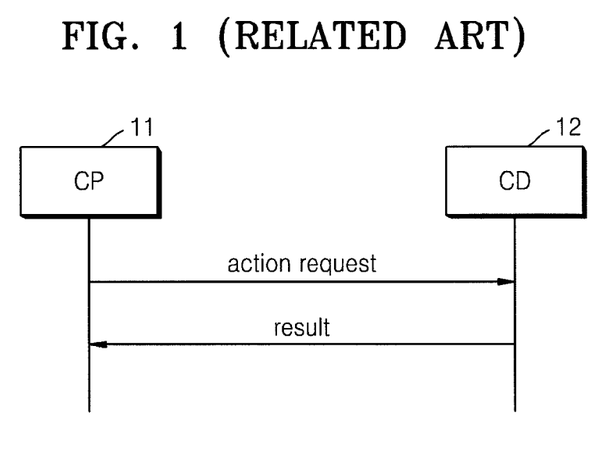
FIG. 1 is a conceptual view for explaining a conventional UPnP control method.

FIG. 1 is a conceptual view for describing a conventional UPnP control method.

Referring to FIG. 1, when a control point CP 11 transmits an action request to a controlled device CD 12, the controlled device 12 executes an action and transmits a result of executing the action to the control point 11 as a response. Specifically, the controlled device 12 executes the requested action and transmits a normal processing result or an error message to the control point 11.

Figure 2:
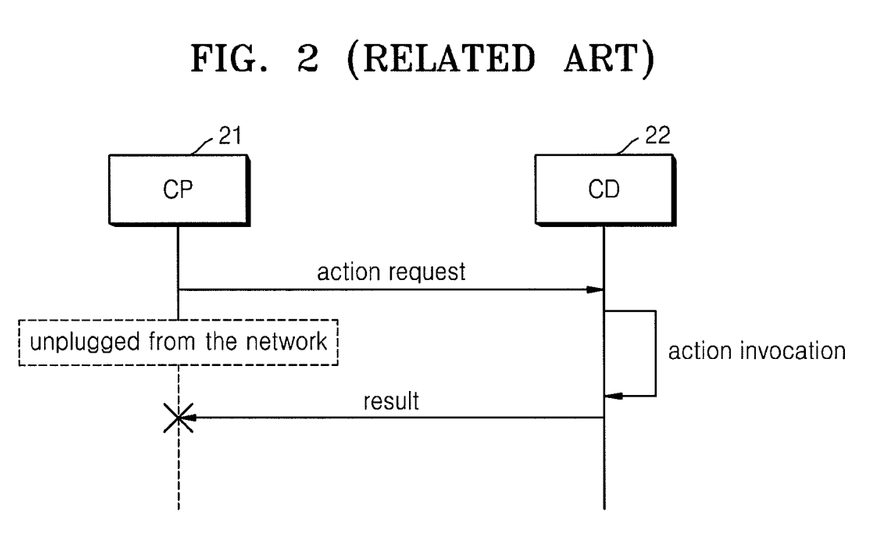
FIG. 2 is a conceptual view for explaining a problem of the conventional UPnP control method.

FIG. 2 is a conceptual view for explaining a problem occurring with the conventional UPnP control method.

Referring to FIG. 2, when a control point CP 21 is unplugged from a network while a controlled device CD 22 that receives an action request from the control point 21 is executing the action (referred to as action invocation), the action is terminated in a state where the controlled device 22 cannot transmit a normal processing result or an error message to the control point 21.

This does not matter in a normal condition. However, in a case where a specific container is copied in a content directory service (CDS), for example, a specific service file is copied in the controlled device, or content synchronization associated with service information between two or more controlled devices is performed, it takes much time for the controlled device to execute the action. In this case, a user has to periodically check operations of the controlled device or has to enable the control point to be connected to the network until the operations of the controlled device are finished. For example, a UPnP action such as an operation of searching for channel information on a television (TV) and storing the channel information requires much time, so that a time to provide a result of the UPnP action needs to be controlled.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

A method of processing an action provides a result of executing an action at an arbitrary time after a controlled device executes the action.

A method also provides control of a controlled device wherein a result of executing an action is received at an arbitrary time after the controlled device executes the action.

Another aspect of the present invention provides a controlled device which provides a result of executing an action at an arbitrary time after the controlled device executes the action.

Another aspect of the present invention provides a control point which receives a result of executing an action at an arbitrary time after a controlled device executes the action.

According to an aspect of the present invention, there is provided a method of processing an action including: executing an action requested by a control point for controlling a controlled device through a network; when a network connection between the controlled device and the control point is terminated, storing a result of executing the action as a pending result of the action; and when the network connection between the controlled device and the control point is resumed, transmitting the stored pending result of the action to the control point.

According to another aspect of the present invention, there is provided a computer-readable medium having embodied thereon a computer program for causing a computer to execute a method of processing an action including: executing an action requested by a control point for controlling a controlled device through a network; when a network connection between the controlled device and the control point is terminated, storing a result of executing the action as a pending result of the action; and when the network connection between the controlled device and the control point is resumed, transmitting the stored pending result of the action to the control point.

According to another aspect of the present invention, there is provided a method of controlling a controlled device, including: requesting the controlled device to execute an action by a control point for controlling the controlled device through a network; transmitting a message for discovering the controlled device existing in the network; and extracting a result of executing the action from a response message responding to the message received from the controlled device.

According to another aspect of the present invention, there is provided a computer-readable medium having embodied thereon a computer program for causing a computer to execute a method of controlling a controlled device, including: requesting the controlled device to execute an action by a control point for controlling the controlled device through a network; transmitting a message for discovering the controlled device existing in the network; and extracting a result of executing the action from a response message responding to the message received from the controlled device.

According to another aspect of the present invention, there is provided a UPnP-based controlled device including: one or more applications which execute actions requested by a control point; a pending result manager which checks a state of a connection between the control point and a network, and stores a result of executing the action as a pending result of the action when the connection between the control point and the network is terminated; and an M-search response generator which adds the pending result of the action to a response message responding to an M-search message when the M-search message is received from the control point after the connection between the control point and the network is resumed.

According to another aspect of the present invention, there is provided a UPnP-based control point for controlling a controlled device, including: one or more applications which request one or more controlled devices to execute actions, receives results of executing the actions from the controlled devices, multicasts an M-search message, and receives response messages responding to the M-search message from the controlled devices; and an M-search response manager which extracts the result of executing the actions from the response messages.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EXEMPLARY EMBODIMENTS

Hereinafter, exemplary embodiments of the present invention will be described in detail with reference to the attached drawings. Like reference numerals in the drawings denote like elements, and thus repeated descriptions will be omitted.

Figure 3:
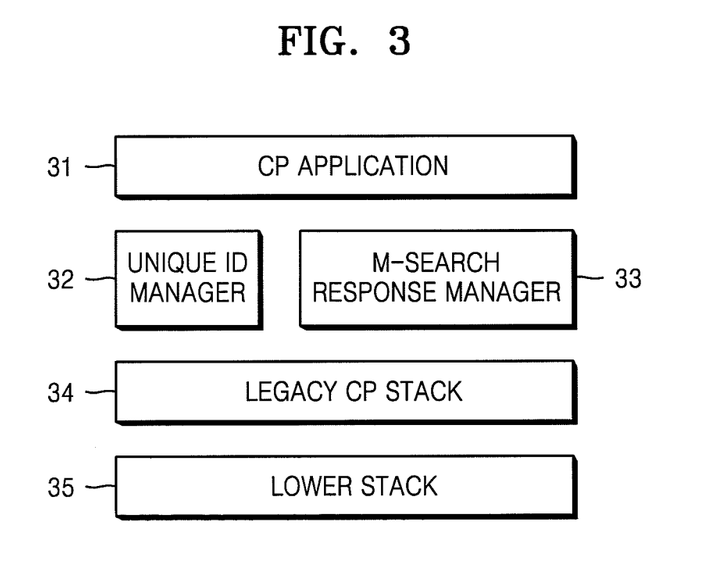
FIG. 3 is a conceptual view showing a structure of a UPnP-based control point according to an exemplary embodiment of the present invention.

FIG. 3 is a conceptual view showing a structure of a UPnP-based control point according to an exemplary embodiment of the present invention.

Referring to FIG. 3, the UPnP-based control point (CP) is a device for controlling services of a controlled device supporting UPnP in a UPnP manner and includes one or more CP applications 31, a unique identifier manager 32, a multicast-search (M-search) response manager 33, a legacy CP stack 34, and a lower stack 35.

A conventional CP includes a CP application, a legacy CP stack, and a lower stack. The CP according to the current exemplary embodiment of the present invention further includes the unique identifier manager 32 and the M-search response manager 33 in addition to the conventional construction.

The unique identifier manager 32 generates a unique identifier (ID) of the CP. The controlled device can identify the CP by using the unique ID. When the unique ID manager 32 transmits to the controlled device a control message for requesting the controlled device to execute an action, the unique ID manager 32 adds the unique ID of the CP to the control message. Accordingly, the controlled device can identify the CP, and when the controlled device cannot transmit a result of executing the action to the CP, the controlled device stores the result of the executing the action to correspond the unique ID and the result to each other. In addition, when the unique ID manager 32 multicasts an M-search message, the unique ID manager 32 adds the unique ID of the CP to the M-search message. Accordingly, the controlled device can identify the CP and transmit the result of executing the previous action to the CP corresponding to the received unique ID. The unique ID manager 32 may add the generated unique ID to the M-search message or a header of the control message in XML form.

The one or more CP applications 31 may request one or more controlled devices to execute actions, receive results of executing the actions from the controlled devices, multicast an M-search message, and receive M-search response messages from the controlled devices. The one or more CP applications 31 may transmit control messages including the unique ID of the CP and the action requests to the one or more controlled devices and multicast the M-search message including the unique ID of the CP. As described above, the one or more CP applications 31 may transmit messages including the unique ID of the CP, so that the controlled devices can identify the CP.

The M-search response manager 33 extracts the result of executing the previous action when the M-search response message received from the controlled device includes the result of executing the previous action. In addition, the M-search response manager 33 provides the extracted result of executing the action to the one or more CP applications 31. The M-search response manager 33 may extract the result of executing the action expressed in XML form added to the M-search response message.

The legacy CP stack 34 includes HTTP used to transceive a document between a web server and an Internet browser of a user through the Internet, SSDP used to recognize devices in the network, a hypertext transport protocol multicast (HTTPMU) including a GENA used in the step of eventing, a hypertext transport protocol unicast (HTTPU) including the SSDP, and the like.

The lower stack 35 includes IP used to transmit data from a computer to another computer through the Internet, a transmission control protocol (TCP) for performing arrangement or error correction in order of arrival of packets, and a user datagram protocol (UDP) used to one-sidedly transmit packets.

Figure 4:
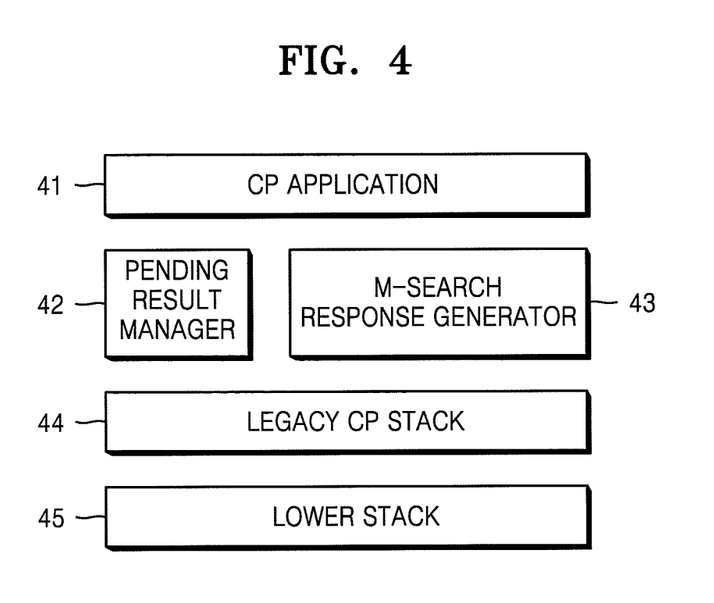
FIG. 4 is a conceptual view showing a structure of a UPnP-based controlled device according to an exemplary embodiment of the present invention.

FIG. 4 is a conceptual view showing a structure of a UPnP-based controlled device according to an exemplary embodiment of the present invention.

Referring to FIG. 4, the UPnP-based controlled device (CD) is a device which is controlled by a CP in an UPnP manner and provides services. The UPnP-based CD includes one or more CD applications 41, a pending result manager 42, an M-search response generator 43, a legacy CD stack 44, and a lower stack 45.

A conventional controlled device includes a CD application, a legacy CD stack, and a lower stack. However, the CD according to the current exemplary embodiment of the present invention further includes the pending result manager 42 and the M-search response manager 43 in addition to the conventional construction.

The one or more CD applications 41 execute actions requested by the CP. The one or more CD applications 41 receive control messages including an unique ID of the CP and the action requests from the CP and execute the request actions. After executing the actions, the one or more CD applications 41 transmit control response messages including a normal processing result that shows a result of executing the action or an error message to the CP. The unique ID may be added to a header of the control message in the XML form.

The pending result manager 42 checks a connection state between the CP and the network. According to the result of the checking, when the connection between the CP and the network is terminated and the control response message including the result of executing the action is not transmitted to the CP, the result of executing the action is stored as a pending result corresponding to the unique ID of the CP. The pending result manager 42 may store the pending result in a pending result table so as to correspond the pending result to the unique ID. The pending result table is described later.

When an M-search message including the unique ID which exists in the pending result table is input, the M-search response manager 43 retrieves a pending result corresponding to the unique ID from the pending result table and adds the retrieved pending result to the M-search response message. The unique ID may be added to a header of the M-search message in the XML form.

The legacy CD stack 44 includes the HTTP used to transceive a document between a web server and an Internet browser of a user through the Internet, the SSDP used to recognize devices in the network, the HTTPMU including the GENA used in the event step, the HTTPU including the SSDP, and the like.

The lower stack 45 includes an IP used to transmit data from a computer to another computer through the Internet, the TCP for performing arrangement or error correction in order of arrival of packets, and the UDP used to one-sidedly transmit packets.

Figure 5:
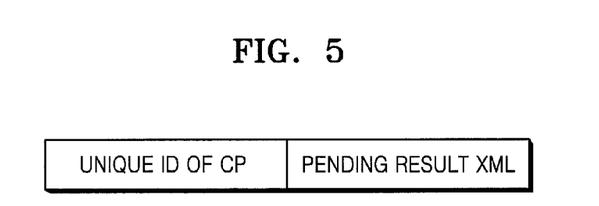
FIG. 5 is a conceptual view showing a pending result table according to an exemplary embodiment of the present invention.

FIG. 5 is a conceptual view showing the pending result table according to an exemplary embodiment of the present invention.

Referring to FIG. 5, the pending result table is generated by a pending result manager included in a CD and stores one or more pending results for every unique ID of a CP in the XML form. The one or more pending results may be stored and managed in various forms such as a comma separated value (CSV), a database management system (DBMS), or a file system.

The pending result table shown in FIG. 5 shows only a unique ID of a single CP. However, it will be understood by those skilled in the art that the pending result table may include a plurality of CPs and one or more pending results corresponding to each of the CPs according to the exemplary embodiments.

Figure 6:
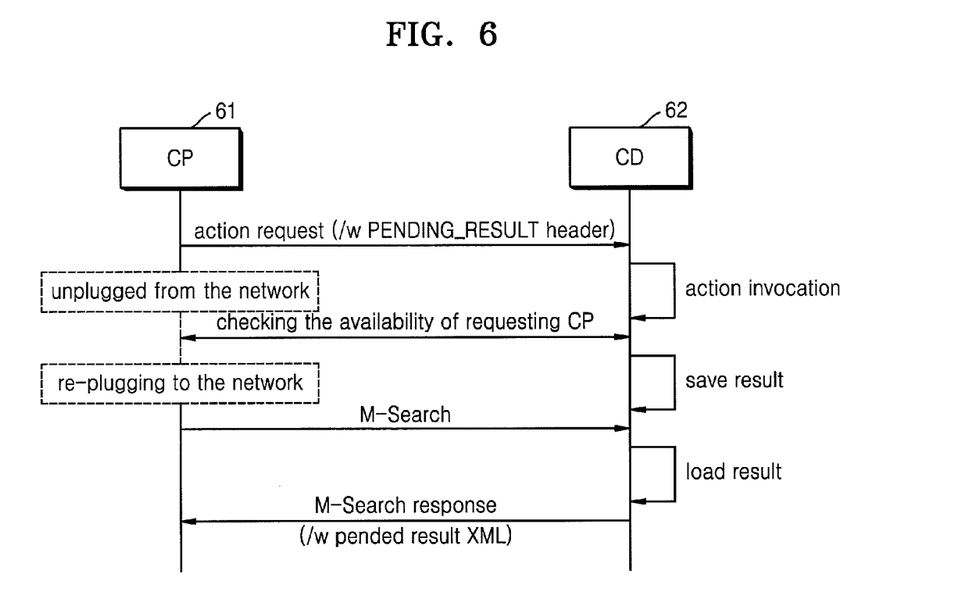
FIG. 6 is a conceptual view for explaining a UPnP-based action processing method according to an exemplary embodiment of the present invention.
Figure 7:
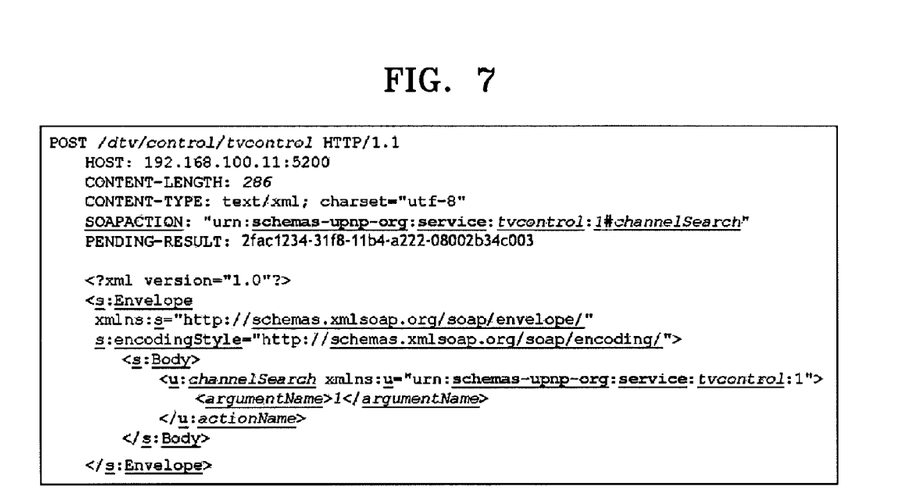
FIG. 7 is a view showing a control message transmitted from a UPnP-based control point according to an exemplary embodiment of the present invention.
Figure 8:
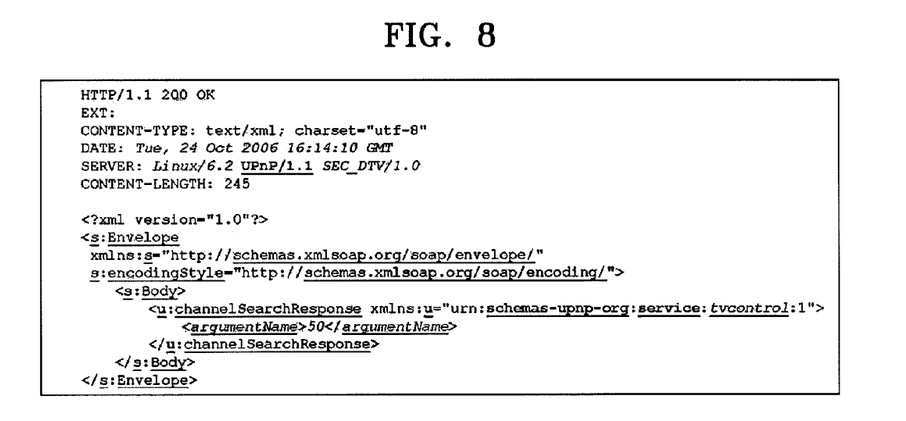
FIG. 8 is a view showing a control response message transmitted from a UPnP-based controlled device according to an exemplary embodiment of the present invention.
Figure 9:
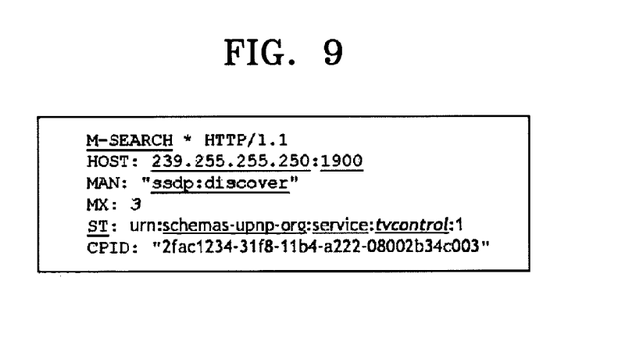
FIG. 9 is a view showing a multicast-search (M-search) message transmitted from a UPnP-based control point according to an exemplary embodiment of the present invention.
Figure 10:
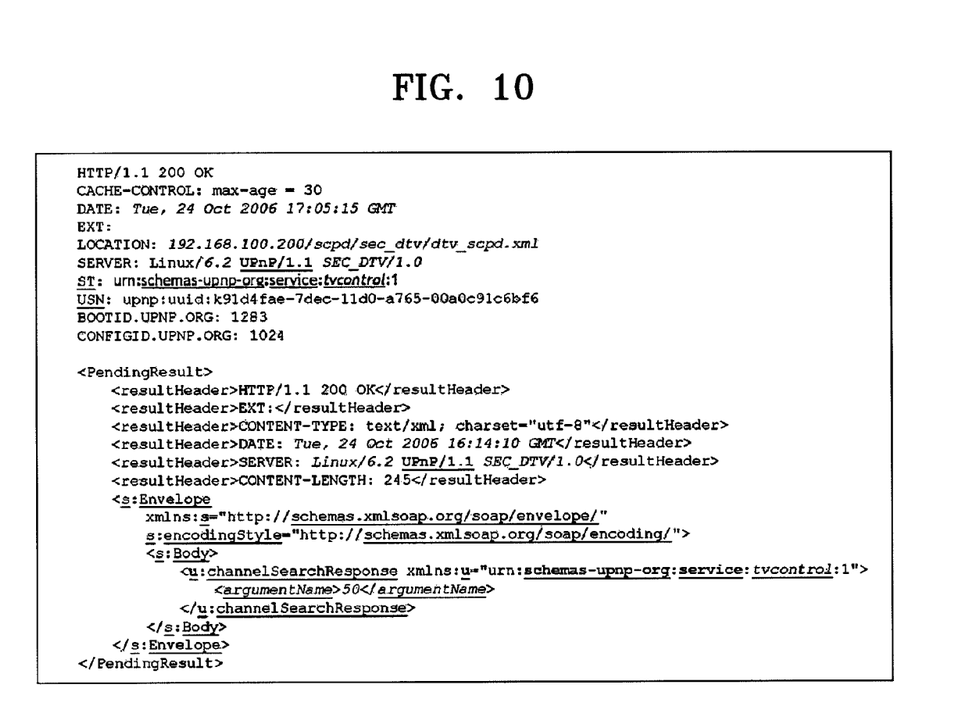
FIG. 10 is a view showing an M-search response message transmitted from a UPnP-based controlled device according to an exemplary embodiment of the present invention.

FIG. 6 is a conceptual view for describing a UPnP-based action processing method according to an exemplary embodiment of the present invention. FIG. 7 is a view showing a control message transmitted from a UPnP-based CP according to an exemplary embodiment of the present invention. FIG. 8 is a view showing a control response message transmitted from a UPnP-based CD according to an exemplary embodiment of the present invention. FIG. 9 is a view showing an M-search message transmitted from a UPnP-based CP according to an exemplary embodiment of the present invention. FIG. 10 is a view showing an M-search response message transmitted from a UPnP-based CD according to an exemplary embodiment of the present invention.

Hereinafter, a UPnP-based action processing method according to an exemplary embodiment of the present invention will be described with reference to FIGS. 6 to 10.

The UPnP-based action processing method includes a CD 62 supporting UPnP and a CP 61 for controlling the CD 62 in the UPnP manner.

The CP 61 transmits a control message to the CD 62. A conventional control message includes only content of an action request, however, the control message according to the current exemplary embodiment of the present invention includes a unique ID of the CP in addition to the action request. The unique ID of the CP is added to a header of the control message in the XML form, and the added unique ID is used when the CD 62 stores pending results.

FIG. 7 shows an example of a control message for requesting channel search of a TV. The control message may be written in a SOAP-based XML form. The conventional control message includes only content of the channel search action of the TV requested to the CD, however, the control message according to the current exemplary embodiment of the present invention includes the unique ID of the CP in a header of the control message as PENDING-RESULT in addition to the content of the channel search action requested to the CD. As described above, the control message includes the unique ID in the header and further includes content for requesting control of the TV, and content for requesting channel search.

As described above, the CP allocates the unique ID of the CP to the control message, so that the CD can identify the CP. In addition, when the CD stores the pending result in the pending result table, the pending result can be stored to correspond to the unique ID.

The CD 62 executes an action according to the control message received from the CP 61 (referred to as action invocation). When the action is terminated, the CD 62 checks a connection state between the CP and the network. Specifically, the CD 62 checks whether a control response message including a result of executing the action can be transmitted to the CP 61 requesting the action (referred to as checking the availability of requesting CP).

According to the result of checking, when the CP 61 is connected to the network, the CD 62 transmits the control response message including the result of executing the action to the CP 61 requesting the action.

FIG. 8 shows an example of a control response message including a result of executing an action, which is transmitted from the CD which receives the control message for requesting channel search of the TV and performs the channel search for the CP, to the CP. The control response message transmitted from the UPnP-based CD includes the result of the action executed according to the control message received by the CD from the CP. The CD which is requested to execute the action of channel search of the TV from the CP executes the action of the channel search, stores the channel search response in the XML form, and transmits an M-search response message to the CP.

As described above, in a normal case, that is, in a case where the connection between the CP and the network is maintained, the CD transmits the control response message including the result of executing the action to the CP.

According to the result of checking, when the CP 61 is unplugged from the network, the CD 62 stores the result of executing the action as a pending result (referred to as save result). The CD 62 matches the pending result to a unique ID included in the control message received from the CP 61 and stores the pending result. The CD 62 stores the pending result in XML form and may construct a pending result table so that the pending result corresponds to the unique ID. The pending result table may match a single unique ID to one or more pending results. The one or more pending results may be stored in a form such as a CSV, a DBMS, or a file system.

When the CP 61 is re-plugged to the network, the CP 61 multicasts an M-search message including the unique ID of the CP 61. For example, the M-search message includes information used for the TV channel search and simultaneously includes the unique ID of the CP 61, so that the CP 61 can request the CD 62, which stores the result of executing the action that previously could not be transmitted to the CP 61, to transmit the stored result of the executing the action.

FIG. 9 shows an example of the M-search message which the UPnP-based CP multicasts in the step of discovering the CD for controlling the TV. The conventional UPnP-based CP multicasts the M-search message for searching the CP to be discovered in the discovery step. As shown in FIG. 9, for the TV control, tvcontrol is included to the M-search message to bemulticast.

However, the CP according to the current exemplary embodiment of the present invention multicasts the M-search message including the control point identifier (CPID). Specifically, when the CP is re-plugged to the network after the CP is unplugged from the network while the CP cannot receive the result of executing the action from the CD in the control step, the CP multicasts the M-search message including CPID in the discovery step. The CP allocates the unique ID to a header of the M-search message so that the CD which executed the action can recognize the CP.

The CD 62 receives the multicast M-search message, checks the CPID included in the M-search message, and retrieves a pending result corresponding to the CPID from the pending result table. The CD 62 adds the pending result corresponding to the CPID to an M-search response message. The CD 62 transmits the M-search response message including the added pending result to the CP 61.

FIG. 10 shows an example of the M-search response message including the retrieved result transmitted from the CD which receives the M-search message for TV control and a result of executing a previous action. The conventional UPnP-based CD receives the M-search message from the CP in the discovery step and transmits information only on the result to the CP in XML form. For example, when the CP multicasts the M-search message including the tvcontrol for TV control, the CD for the TV unicasts an M-search response message including a corresponding response to the CP.

However, the UPnP-based CD according to the current exemplary embodiment of the present invention stores the result of executing the action that is not transmitted in the control step as the pending result corresponding to the CPID, and when the CD receives the M-search message from the CP corresponding to the ID in a next discovery step, the CD adds the pending result including the result of executing the action that is not transmitted in the previous control step to the M-search response message to transmit the pending result to the CP. The M-search response message shown in FIG. 10 includes <PendngResult> including the result of the TV channel search in XML form.

Figure 11:
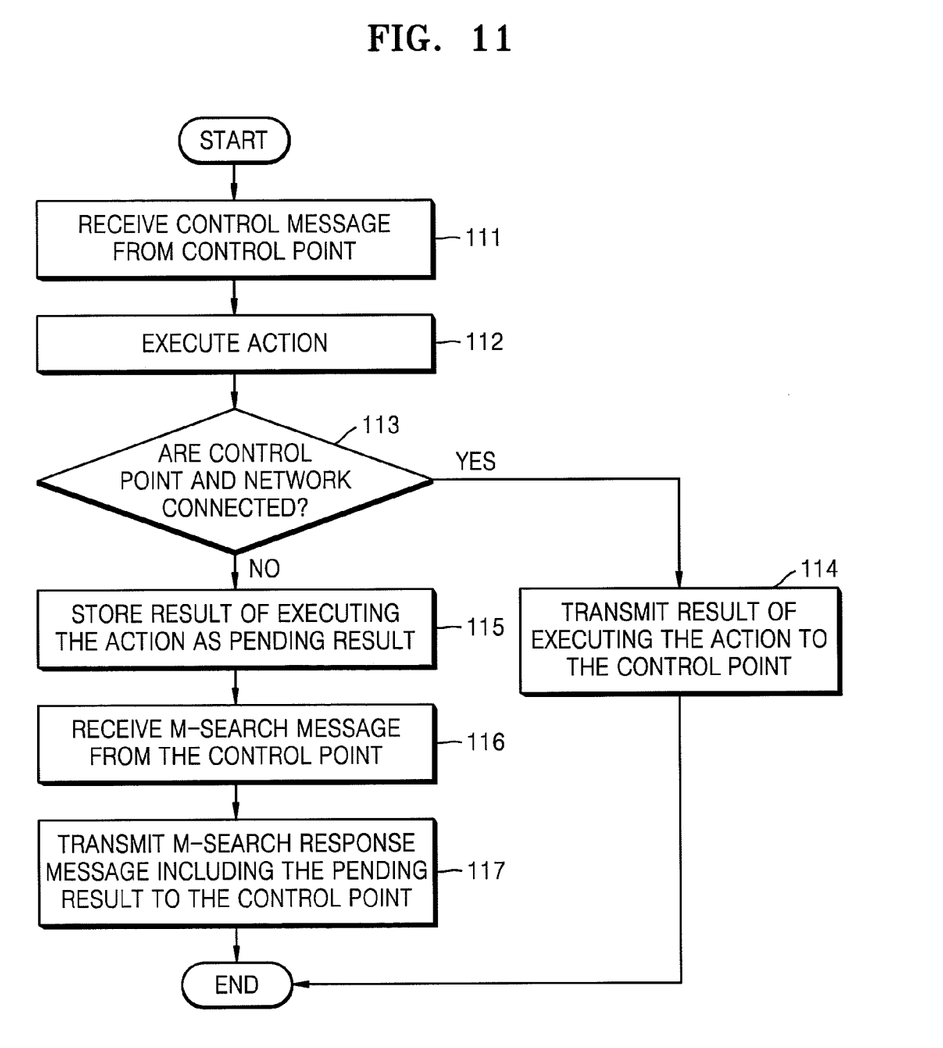
FIG. 11 is a flowchart for explaining a UPnP-based action processing method according to an exemplary embodiment of the present invention.

FIG. 11 is a flowchart of a UPnP-based action processing method according to an exemplary embodiment of the present invention.

Referring to FIG. 11, a UPnP-based CD receives a control message for requesting an action from a CP for controlling the CD in the UPnP manner (111). The control message includes the action request and a unique ID of the CP. The unique ID may be added to a header of the control message in XML form.

Next, the CD executes the requested action (112). According to a type of the CD and a type of the requested action, a time taken to execute the action may be different. When the time taken to execute the action is long, the connection between the CP and the network may be terminated.

The CD checks a connection state between the CP and the network (113). A pending result manager included in the CD may check the state of the connection between the CP and the network.

In operation 114, according to a result of checking, when the CP is connected to the network, the CD transmits the result of executing the action to the CP.

According to the result of checking, when the CP is not connected to the network, the CD stores the result of executing the action as a pending result (115). The pending result manager included in the CD stores the result of executing the action so that the result and the unique ID of the CP correspond to each other, and generates the pending result. The pending result manager may store the pending result corresponding to the unique ID in a pending result table in a form of a CSV, a DBMS, or a file system.

When the CP is reconnected to the network, the CD receives an M-search message from the CP (116). The CD receives the M-search message including the unique ID of the CP. The unique ID of the CP may be added to a header of the M-search message in XML form.

The CD transmits an M-search response message including the pending result to the CP (117). An M-search response message generator included in the CD may retrieve the pending result corresponding to the unique ID of the CP from the pending result table and add the pending result to the M-search response message.

Figure 12:
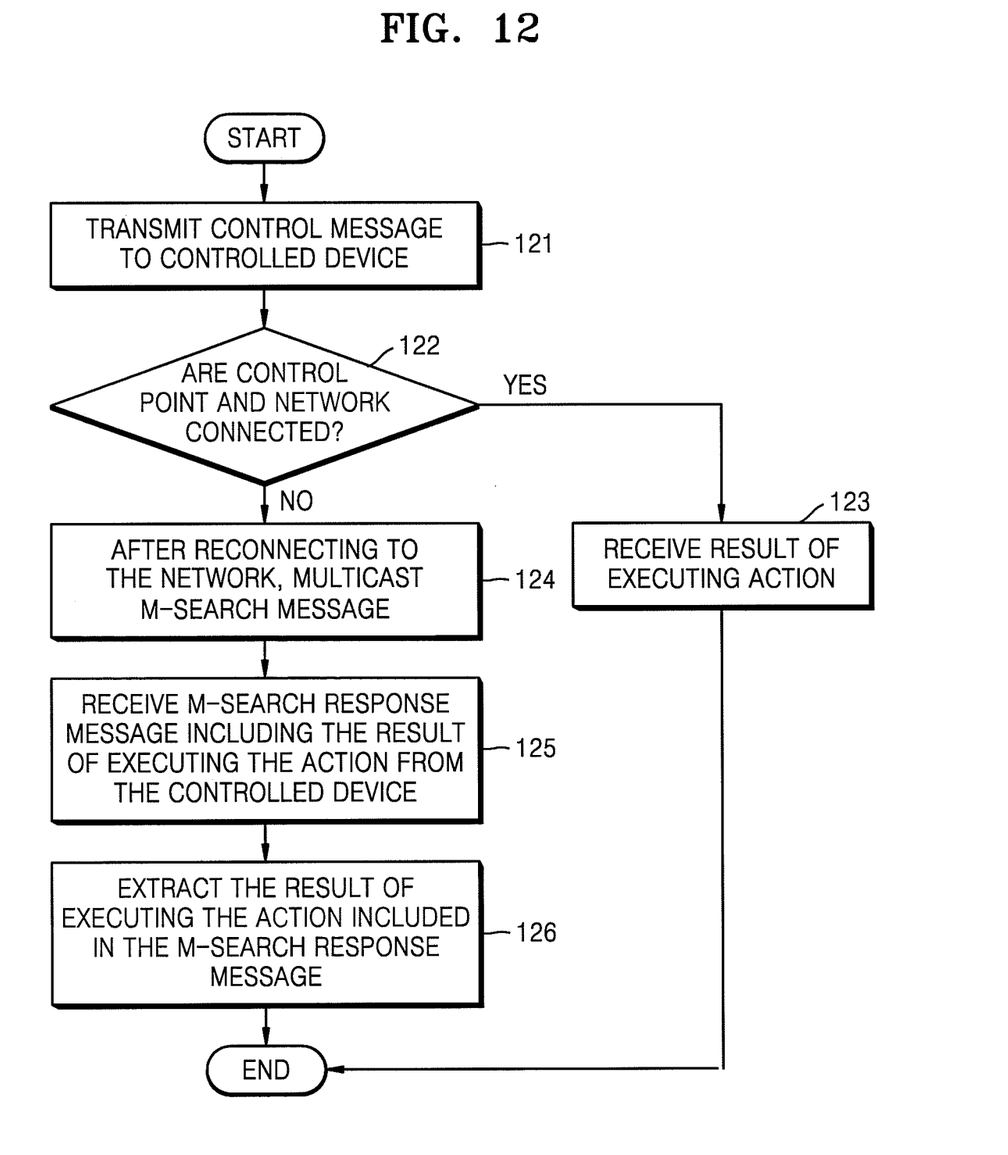
FIG. 12 is a flowchart for explaining a UPnP-based controlled device control method according to another exemplary embodiment of the present invention.

FIG. 12 is a flowchart of a UPnP-based controlled device control method according to another exemplary embodiment of the present invention.

Referring to FIG. 12, a UPnP-based CP transmits a control message for requesting a CD which supports the UPnP to execute an action to the CD (121). The control message includes the action request and a unique ID of the CP. The unique ID may be added to a header of the control message in XML form.

A connection between the CP and the network is checked (122). A time taken to execute the action by the CD may be different according to a type of the requested action, and when the time taken to execute the action is long, the connection between the CP and the network may be terminated.

When the CP is connected to the network, the CP receives a result of executing the action from the CD (123).

When the CP is reconnected to the network after the connection between the CP and the network is terminated, the CP multicasts an M-search message (124). A unique ID manager included in the CP adds a unique ID of the CP in a header of an M-search message in the XML form.

The CP receives an M-search response message including the result of executing the action from the CD (125). The CP receives the M-search response message including a control response message corresponding to the unique ID included in the M-search message multicasted by the CP, from the CD.

The CP extracts the result of executing the action added to the received M-search response message (126). Specifically, an M-search response manager included in the CP extracts the control response message added to the M-search response message to provide applications included in CP.

As described above, by controlling the UPnP-based CD, although the connection between the CP and the network is terminated before the CP receives the result of executing the action from the CD, when the CP is reconnected to the network, the CP can receive the M-search response message including the result of executing the action from the CD in the M-search step.

As described above, according to the action processing method, the CD control method, the CD, and the CP according to the exemplary embodiments of the present invention, although the CP is unplugged from the network in a state where the CP cannot receive the result of executing the action from the CD, the CP can receive the result of executing the action included in the M-search response message in the discovery step after the CP is reconnected to the network.

As described above, according to the action processing method, the CD control method, the CD, and the CP, the CP can receive the result of executing the action of the CD at an arbitrary time after an action executing time, so that the inconvenience of waiting for the result of executing the action requested to the CD by a CP user decreases.

The invention can also be embodied as computer readable codes on a computer readable recording medium. The computer readable recording medium is any data storage device that can store data which can be thereafter read by a computer system. Examples of the computer readable recording medium include, but are not limited to, read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method of processing an action, the method comprising:
   receiving, at a controlled device, a message including a unique identification (ID) of a control point and a request for the action;
   executing, at the controlled device, an action requested by the control point for controlling the controlled device through a network;
   storing, at the controlled device, in correspondence with the unique ID of the control point, a result of executing the action as a pending result of the action when a network connection between the controlled device and the control point is terminated; and
   transmitting the stored pending result of the action to the control point identified by the unique ID when the network connection between the controlled device and the control point is resumed; and receiving a message for discovering a controlled device existing in the network from the control point, wherein the unique ID of the control point is a persistent identification of the control point generated by the control point and the message including the unique ID of the control point is received at the controlled device, each time the control point reconnects to the network, wherein the pending result of the action is stored in a form of a pending result table, wherein the pending result table comprises one or more pending results for every unique ID of the control point, and wherein in the transmitting the stored pending result, the stored pending result of the action is added to a response message responding to the message for discovering a controlled device in order to be transmitted.

2. The method of claim 1, wherein the network is a universal plug and play network, and wherein the message for discovering the controlled device existing in the network from the control point is a multicast-search (M-search) message.

3. The method of claim 1, further comprising transmitting the result of executing the action to the control point when the network connection between the controlled device and the control point is maintained.

4. The method of claim 1, wherein in receiving, at the controlled device, the message including the unique ID of the control point and the request for the action, the unique ID of the control point added to a header in extensible markup language (XML) form is received.

5. The method of claim 1, wherein the network is a UPnP network, and the controlled device receives its IP address by using a dynamic host configuration protocol (DHCP) or the controlled device assigns its IP address by using an auto IP function.

6. A non-transitory computer-readable medium having embodied thereon a computer program for causing a computer to execute a method of processing an action, the method comprising:

receiving a message for discovering a controlled device existing in the network from a control point;

receiving, at a controlled device, a message including a unique identification (ID) of the control point and a request for the action;

executing, at the controlled device, an action requested by the control point for controlling the controlled device through a network;

storing, at the controlled device, in correspondence with the unique ID of the control point, a result of executing the action as a pending result of the action when a network connection between the controlled device and the control point is terminated; and transmitting the stored pending result of the action to the control point identified by the unique ID when the network connection between the controlled device and the control point is resumed, wherein the unique ID of the control point is a persistent identification of the control point generated by the control point and the message including the unique ID of the control point is received at the controlled device, each time the control point reconnects to the network, wherein the pending result of the action is stored in a form of a pending result table, wherein the pending result table comprises one or more pending results for every unique ID of the control point, and wherein in the transmitting the stored pending result, the stored pending result of the action is added to a response message responding to the message for discovering a controlled device in order to be transmitted.

7. A method of controlling a controlled device, the method comprising:

transmitting, by a control point, a message including a unique identification (ID) of a control point and a request which requests a controlled device to execute an action for controlling the controlled device through a network;

transmitting, by the control point, a message for discovering the controlled device existing in the network;

receiving the message for discovering the controlled device existing in the network from the control point; and extracting, at the control point, a result of executing the action from a response message corresponding to the unique ID of the control point responding to the message received from the controlled device when a network connection between the controlled device and the control point is resumed, wherein the unique ID of the control point is a persistent identification of the control point generated by the control point and the message including the unique ID of the control point is received at the controlled device, each time the control point reconnects to the network, and wherein the response message includes the result of the executed action stored at the controlled device, wherein when the network connection between the controlled device and the control point is terminated, the result of the executed action is stored in a form of a pending result table as a pending result of the action, wherein the pending result table comprises one or more pending results for every unique ID of the control point, and wherein the stored pending result of the action is added to a response message responding to the message for discovering the controlled device.

8. The method of claim 7, wherein the network is a UPnP network, and the controlled device receives its IP address by using a dynamic host configuration protocol (DHCP) or the controlled device assigns its IP address by using an auto IP function.

9. The method of claim 7, wherein the network is a UPnP network, and wherein the message for discovering the controlled device existing in the network is a multicast-search message.

10. The method of claim 7, wherein in transmitting the message including the unique ID of the control point and the request for executing the action, the unique ID of the control point which is added in a header of the message in XML form is transmitted to the controlled device.

11. The computer-readable medium having embodied thereon a computer program as recited in claim 6, wherein the network is a UPnP network, and the controlled device receives its IP address by using a dynamic host configuration protocol (DHCP) or the controlled device assigns its IP address by using an auto IP function.

12. A non-transitory computer-readable medium having embodied thereon a computer program for causing a computer to execute a method of controlling a controlled device, the method comprising:

transmitting, by a control point, a message including a unique identification (ID) of a control point and a request which requests a controlled device to execute an action for controlling the controlled device through a network;

transmitting, by the control point, a message for discovering the controlled device existing in the network;

receiving the message for discovering the controlled device existing in the network from the control point; and extracting, at the control point, a result of executing the action from a response message corresponding to the unique ID of the control point responding to the message received from the controlled device when a network connection between the controlled device and the control point is resumed, wherein the unique ID of the control point is a persistent identification of the control point generated by the control point and the message including the unique ID of the control point is received at the controlled device, each time the control point reconnects to the network, wherein the response message includes the result of the executed action stored at the controlled device, wherein when the network connection between the controlled device and the control point is terminated, the result of the executed action is stored in a form of a pending result table as a pending result of the action, wherein the pending result table comprises one or more pending results for every unique ID of the control point, and wherein the stored pending result of the action is added to a response message responding to the message for discovering the control device.

13. The computer-readable medium having embodied thereon a computer program as recited in claim 12, wherein the network is a UPnP network, and the controlled device receives its IP address by using a dynamic host configuration protocol (DHCP) or the controlled device assigns its IP address by using an auto IP function.

14. A UPnP-based controlled device comprising:

one or more applications which receive a message from a control point for discovering a controlled device including a unique ID of the control point and a request for an action, execute the action requested by the control point, and transmit a result of executing the action to the control point;

a pending result manager checking a state of a connection between the control point and a network and storing a result of executing the action as a pending result of the action when the connection between the control point and the network is terminated; and a multicast-search (M-search) response generator which adds the pending result of the action to a response message responding to an M-search message when the M-search message is received from the control point after the connection between the control point and the network is resumed, wherein the unique ID of the control point is a persistent identification of the control point generated by the control point and the message including the unique ID of the control point is received at the controlled device, each time the control point reconnects to the network, wherein the pending result of the action is stored in a form of a pending result table, wherein the pending result table comprises one or more pending results for every unique ID of the control point.

15. The controlled device of claim 14, wherein the pending result manager stores the unique ID and the pending result of the action so that the unique ID and the pending result correspond to each other.

16. The controlled device of claim 15, wherein the M-search response generator adds the pending result of the action corresponding to the unique ID to the response message.

17. A UPnP-based control point for controlling a controlled device, the control point comprising:

a unique ID manager which generates a unique ID of the control point;

one or more applications which request one or more controlled devices to execute actions, receive results of executing the actions from the controlled devices, multicast a multicast-search (M-search) message for discovering a controlled device existing in the network, and receive response messages responding to the M-search message from the controlled devices; and an M-search response manager which extracts the result of executing the actions from the response messages, wherein the response message includes the results of the executed actions stored at the controlled devices, wherein the unique ID of the control point is a persistent identification of the control point generated by the control point and the message including the unique ID of the control point is received at the controlled device, each time the control point reconnects to the network, wherein when the network connection between the controlled device and the control point is terminated, the result of executing the action is stored in a form of a pending result table as a pending result of the action, wherein the pending result table comprises one or more pending results for every unique ID of the control point, and wherein in transmitting the stored pending result, the stored pending result of the action is added to the response message responding to the message for discovering the control device in order to be transmitted when a network connection between the controlled device and the control point is resumed.

18. The control point of claim 17, wherein each of the one or more applications transmits a control message including the unique ID of the control point and the request for the action to the controlled device and receives the result of executing the action corresponding to the unique ID from the controlled device.

* * * * *